United States Patent
Woo et al.

(10) Patent No.: US 11,594,713 B2
(45) Date of Patent: *Feb. 28, 2023

(54) NOTCHING APPARATUS AND METHOD FOR SECONDARY BATTERY

(71) Applicant: LG ENERGY SOLUTION, LTD., Seoul (KR)

(72) Inventors: Sang Jin Woo, Daejeon (KR); Sin Young Park, Daejeon (KR); Tae Won Kang, Daejeon (KR); Ji Soo Park, Daejeon (KR); Dong Hyeuk Park, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 541 days.

This patent is subject to a terminal disclaimer.

(21) Appl. No.: 16/743,251

(22) Filed: Jan. 15, 2020

(65) Prior Publication Data

US 2020/0152962 A1 May 14, 2020

Related U.S. Application Data

(63) Continuation of application No. PCT/KR2019/000126, filed on Jan. 4, 2019.

(30) Foreign Application Priority Data

May 23, 2018 (KR) .......................... 10-2018-0058577

(51) Int. Cl.
*H01M 4/04* (2006.01)
*B21D 28/02* (2006.01)
*F26B 3/30* (2006.01)

(52) U.S. Cl.
CPC .......... *H01M 4/0471* (2013.01); *B21D 28/02* (2013.01); *F26B 3/30* (2013.01)

(58) Field of Classification Search
CPC .......... H01M 4/047; B21D 28/02; F26B 3/30
(Continued)

(56) References Cited

U.S. PATENT DOCUMENTS 6,053,953 A * 4/2000 Tomiyama ........ H01M 10/0525
429/231.95
6,159,253 A * 12/2000 Lund ................. H01M 10/0431
429/136

(Continued)

FOREIGN PATENT DOCUMENTS

CN 102544434 A 7/2012
CN 102592835 A 7/2012
(Continued)

OTHER PUBLICATIONS

Extended European Search Report for European Application No. 19807482.5, dated Nov. 10, 2020.
(Continued)

*Primary Examiner* — Stephen M Gravini
(74) *Attorney, Agent, or Firm* — Birch, Stewart, Kolasch & Birch, LLP

(57) ABSTRACT

Discussed is a notching apparatus and method for a secondary battery. The notching apparatus includes: a notching unit notching a portion of an electrode that is continuously supplied; a drying unit drying the electrode while the electrode discharged from the notching unit passes therethrough; and a collecting unit collecting the electrode discharged from the drying unit, wherein the drying unit includes a heating body provided with a drying space that is a passage through which the electrode passes therein, and lamp parts mounted on the heating body to irradiate infrared rays onto a surface of the electrode while the electrode moves through the drying space.

15 Claims, 8 Drawing Sheets

(58) Field of Classification Search
USPC .................................................... 29/623.1
See application file for complete search history.

(56) References Cited

U.S. PATENT DOCUMENTS

| | | | | |
|---|---|---|---|---|
| 6,192,599 | B1 * | 2/2001 | Bryant | .................... F26B 13/10 34/400 |
| 6,371,995 | B1 * | 4/2002 | Yasunami | ......... H01M 10/0587 429/324 |
| 7,498,625 | B2 * | 3/2009 | Takamatsu | ........ H01L 27/11502 257/295 |
| 7,748,138 | B2 * | 7/2010 | Moriya | ............ H01L 21/67742 156/345.31 |
| 8,196,312 | B2 * | 6/2012 | Taguchi | .................. F26B 13/10 159/7 |
| 2009/0007452 | A1 | 1/2009 | Cho | |
| 2010/0058609 | A1 * | 3/2010 | Taguchi | .................. F26B 13/10 34/443 |
| 2013/0244083 | A1 | 9/2013 | Min et al. | |
| 2016/0006018 | A1 | 1/2016 | Wang et al. | |
| 2016/0093880 | A1 | 3/2016 | Song et al. | |
| 2020/0152962 | A1 * | 5/2020 | Woo | .......... F26B 3/30 |
| 2020/0161629 | A1 * | 5/2020 | Woo | .................. H01M 10/0404 |

FOREIGN PATENT DOCUMENTS

| | | | |
|---|---|---|---|
| CN | 103222096 A | 7/2013 | |
| CN | 105470446 A | 4/2016 | |
| CN | 107285084 A | 10/2017 | |
| CN | 110892558 A | 3/2020 | |
| EP | 1967803 B1 * | 9/2016 | ........... B41C 1/1083 |
| EP | 3 404 745 A1 | 11/2018 | |
| EP | 3 595 049 A1 | 1/2020 | |
| EP | 3641023 A1 * | 4/2020 | ............ B21D 28/02 |
| JP | 2011-134545 A | 7/2011 | |
| JP | 2012-146851 A | 8/2012 | |
| JP | 2013-235673 A | 11/2013 | |
| JP | 5421934 B2 | 2/2014 | |
| JP | 2014-107237 A | 6/2014 | |
| JP | 2014107018 A | 6/2014 | |
| JP | 2014-127438 A | 7/2014 | |
| KR | 10-0666052 B1 | 1/2007 | |
| KR | 10-2008-0059358 A | 6/2008 | |
| KR | 10-1077069 B1 | 10/2011 | |
| KR | 10-2012-0076850 A | 7/2012 | |
| KR | 10-2012-0082367 A | 7/2012 | |
| KR | 10-1175031 B1 | 8/2012 | |
| KR | 10-2015-0037242 A | 4/2015 | |
| KR | 10-2015-0126920 A | 11/2015 | |
| KR | 10-2018-0038888 A | 4/2018 | |
| WO | WO-2019225828 A1 * | 11/2019 | ............. B21D 28/02 |

OTHER PUBLICATIONS

International Search Report for PCT/KR2019/000126 dated Apr. 17, 2019.

* cited by examiner

NOTCHING APPARATUS AND METHOD FOR SECONDARY BATTERY

CROSS-REFERENCE TO RELATED APPLICATIONS

The present application is a Continuation of PCT/KR2019/000126, filed on Jan. 4, 2019, which claims the benefit of the priority of Korean Patent Application No. 10-2018-0058577, filed on May 23, 2018, all of which are hereby incorporated by reference in their entirety.

TECHNICAL FIELD

The present invention relates to a notching apparatus and method for a secondary battery, and more particularly, to a notching apparatus for a secondary battery, with which a drying device for quickly drying moisture remaining on a surface of an electrode by continuously heating the notched electrode according to a production process (without moving to another place) is combined, and a notching method for the secondary battery.

BACKGROUND ART

Secondary batteries refer to batteries that are chargeable and dischargeable unlike primary batteries that are not chargeable. Such a secondary battery is widely used not only for portable devices such as a mobile phone, a notebook, and a camcorder but also for transportation such as an electric vehicle. As a result, the secondary battery is gradually expanding in a range of application.

In general, the secondary battery has a structure comprising an electrode assembly having a structure in which electrodes (a negative electrode and a positive electrode) and a separator are alternately stacked, an electrolyte allowing ions to move to the electrodes, and a case in which the electrode assembly and the electrolyte are accommodated. The electrode assembly is manufactured so that the positive electrode, the negative electrode, and the separator are alternately stacked to form a plurality of layers.

Also, a process of manufacturing the secondary battery is largely classified into an electrode plate process of manufacturing a positive electrode plate and a negative electrode plate, an assembly process of inserting an electrode together with an electrolyte into a case after the electrode assembly is manufactured by using the positive electrode plate and the negative electrode plate, and a formation process of activating movement of ions of the electrode assembly. Each of the electrode plate process, the assembly process, and the formation process is divided into detailed processes.

Here, the electrode plate process comprises a mixing process of mixing a conductive material and a binder into an active material, a coating process of applying the mixed active material on a collector, a press process of pressing the active material onto a surface of the collector, and a process of shearing the electrode so that the electrode in which the active material adheres to the surface of the collector is cut to a proper size to form an electrode tab. Here, a slitting process for cutting the electrode (with the active material applied on the surface of the collector) to the proper size and a notching process of shearing the electrode to form the electrode tab may be performed sequentially or simultaneously.

Although the notching process belongs to the electrode plate process or the assembly process, the notching process may comprise a process of shearing the electrode into a predetermined pattern, but a separate drying process is required. Since a lamination process of continuously bonding the electrode to the separator is performed after the shearing process, the drying process is necessarily required to dry the moisture that remains on the surface of the electrode to interfere with the bonding.

However, the drying process according to the related art is performed in a manner in which the notched electrode manually moves and is stored and then is put into a vacuum drying device (a vacuum dryer (VD)) in a unit of a certain quantity, and hot air is blown in a state in which a negative pressure is applied to dry the moisture.

However, the drying method has a problem that it takes a considerable time for the movement and storage of the electrode. This problem has become a main cause of delay of an entire production process time as a production amount of products increases.

DISCLOSURE OF THE INVENTION

Technical Problem

Thus, to solve the conventional problem in which the shearing process and the drying process of the notching process are individually performed to increase in process time, a main object of the present invention is to provide a notching apparatus and method for a secondary battery, in which a process time is reduced, and drying is performed through infrared radiation instead of hot air to improve drying efficiency and reduce a defect occurrence rate.

Technical Solution

To achieve the above object, the present invention comprises: a notching unit shearing an electrode that is continuously supplied; a drying unit drying the electrode while the electrode discharged from the notching unit passes therethrough; and a collecting unit of collecting the electrode discharged from the drying unit, wherein the drying unit comprises a heating body provided with a drying space that is a passage, through which the electrode passes, therein and lamp parts mounted on the heating body to irradiate infrared rays onto a surface of the electrode while the electrode moves through the drying space.

Each of the lamp parts according to the present invention may comprise: a housing of which a side facing the electrode is opened and which is fixed and mounted on the drying unit; a heating lamp mounted on the housing to generate the infrared rays according to applying of power; and a reflection plate mounted on the housing to reflect the infrared ray irradiated from the heating lamp to the opened side of the housing.

Also, the heating lamp may have a straight shape and is mounted in parallel to a longitudinal direction of the housing or may have a bulb shape according to a process or a design of the apparatus. Also, the reflection plate may have a concave shape to reflect the infrared rays reflected or generated by the heating lamp to the opened side.

According to the present invention, the electrode may have a structure in which an active material is applied to a surface of a collector made of a metal material, and the infrared rays irradiated from the heating lamp may have a wavelength in which an absorption rate of the infrared rays into the active material is higher than that of the infrared rays into the collector. That is, the irradiated infrared rays may be reflected by the collector and absorbed into the active material.

The lamp parts facing each other may be continuously or contiguously disposed or disposed with an interval therebetween, and spaces between the lamps facing each other may be connected to each other to form or constitute the drying space.

The drying space may have a horizontal section formed in a horizontal direction and a vertical section formed in a vertical direction within the drying unit. A transfer roller for switching a transfer direction may be disposed at a portion at which the electrode is switched between the horizontal section and the vertical section.

Furthermore, an auxiliary frame having a vertical surface of which both side surfaces are vertically erected and a horizontal top surface may be built in the heating body, and a portion of the lamp parts may be mounted on the vertical surface and the horizontal surface of the auxiliary frame, wherein the vertical section of the drying space may be formed at a position at which the electrode passes through the vertical surface of the auxiliary frame, and the horizontal section may be formed at a position at which the electrode passes through the horizontal surface of the auxiliary frame.

Also, the collecting unit may comprise a collecting roller winding the electrode so as to be wound therearound, and an exhaust device for discharging moisture evaporated in the heating body to the outside may be mounted in the heating body.

The present invention additionally provides an electrode notching method for a secondary battery. The method according to the present invention comprises: a notching step of shearing an electrode, which is continuously supplied, into a predetermined electrode pattern; a drying step of irradiating infrared rays onto a surface of the notched electrode to dry the electrode; and a collecting step of collecting the dried electrode, wherein, in the drying step, the electrode is dried while passing through a drying space into which the infrared rays are irradiated, and the drying space has a portion formed in a horizontal direction parallel to the ground and a portion formed in a vertical direction perpendicular to the ground.

A transfer roller may be disposed between the portion formed in the horizontal direction and the portion formed in the vertical direction in the drying space, and a transfer direction of the electrode may be changed through the transfer roller.

Advantageous Effects

The electrode notching apparatus for the secondary battery according to the present invention may comprise the notching unit, the drying unit, and the collecting unit. The drying unit may be configured so that the notched electrode is continuously dried to quickly dry the moisture remaining on the electrode, thereby reducing the entire process time and improving the productivity. That is, the productivity may be improved when compared to the conventional process in which the notched electrode manually moves and is stored so as to be dried in the unit of the certain quantity.

The drying unit according to the present invention may comprise a plurality of heating lamps. Thus, the heating lamps may dry the surface of the electrode by irradiating the infrared rays, and thus, the drying rate may be excellent, the surface of the electrode may be dried more uniformly than the conventional hot air drying, and the drying time may be reduced. Particularly, the heating lamps of the present invention may irradiate the infrared rays having the wavelength, in which the absorption rate of the infrared rays into the active material is higher than that of the infrared rays into the collector (that is to say, infrared rays having a specific wavelength, which are reflected by the collector that is the metal material and are absorbed into the active material, are irradiated), to generate the heat in only the active material of the electrode. That is, the drying may be performed in the manner, in which the molecular motion is activated in only the active material, to prevent the collector from being thermally deformed, and also, the temperature rise inside the drying chamber may be suppressed to improve the durability of the peripheral devices.

Also, since the lamp part is manufactured by mounting the heating lamps on the housing with the reflection plate mounted, the infrared rays of the heating lamps may be concentrated into one point without scattering the infrared rays, and if necessary (the case in which the heating lamps have different breakage lifetimes or product lifetimes, or the case in which the heating lamps having a higher output are required), the heating lamps may be easily replaced. Furthermore, each of the heating lamps may have the rod shape, and thus, the number of heating lamps to be mounted may be reduced when compared to the number of lamps, each of which has a bulb shape, and the wider area may be dried.

In addition, according to the present invention, the drying space in which the electrode is dried may have the horizontal section formed in the horizontal direction and the vertical section formed in the vertical direction in the drying unit, and the transfer roller for switching the direction of the electrode may be disposed at the point, at which the horizontal section and the vertical section are switched, to increase in length of the drying space within the heating body, thereby improving the drying performance.

MODE FOR CARRYING OUT THE INVENTION

Figure 1:
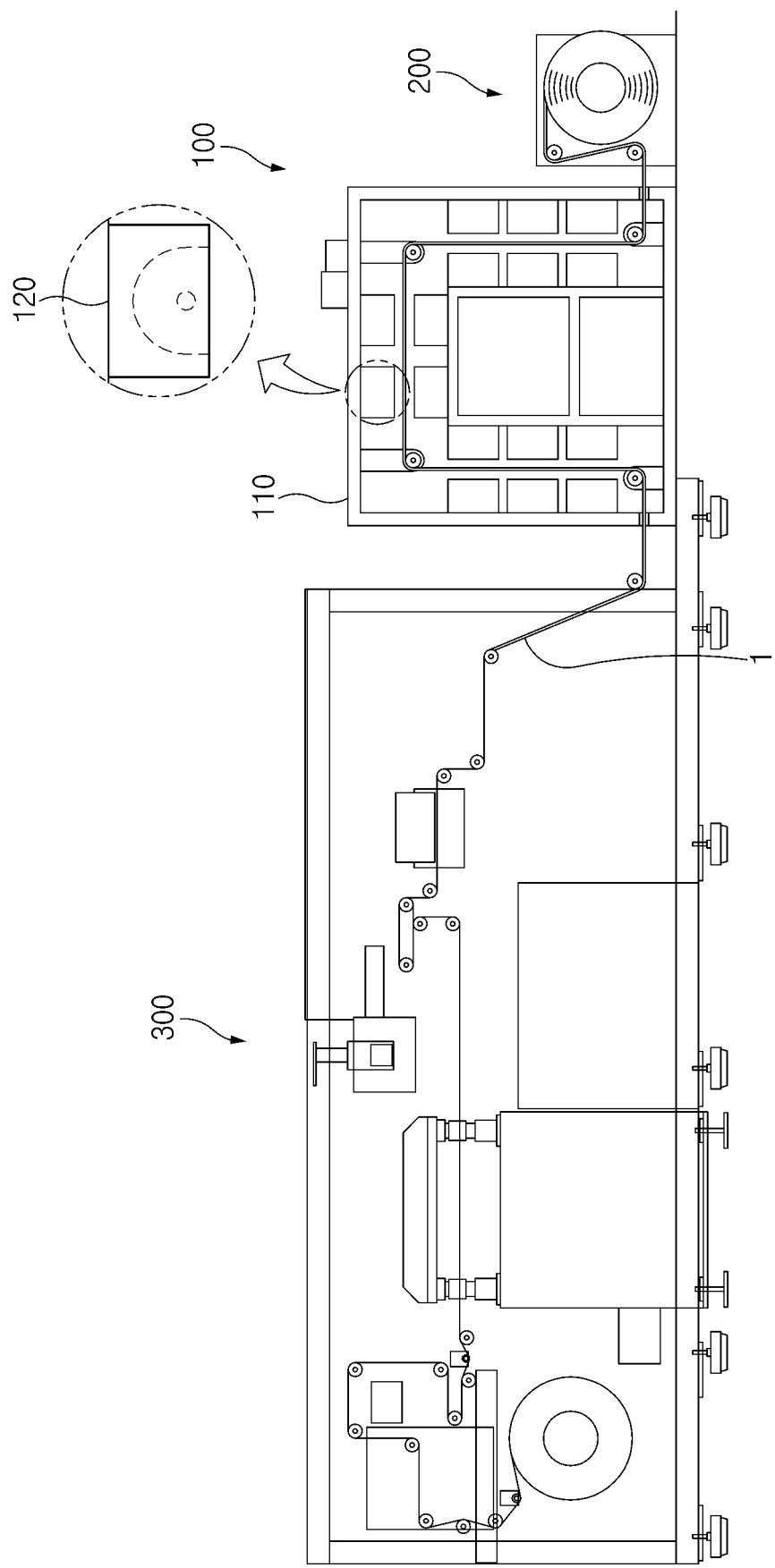
FIG. 1 is a front view of an electrode notching apparatus for a secondary battery according to an embodiment of the present invention.

Hereinafter, exemplary embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode notching apparatus and method for a secondary battery and may have an effect in which a process time is reduced, and drying is performed through infrared radiation instead of hot air to improve drying efficiency and reduce a defect occurrence rate.

Hereinafter, embodiments according to the present invention will be described with reference to the accompanying drawings.

Embodiment 1

According to Embodiment 1 of the present invention, an electrode notching apparatus for a secondary battery, which comprises a notching unit 300, a drying unit 100, and a collecting unit 300, is provided.

Referring to FIG. 1, the notching unit 300 provided in the notching apparatus is configured to shear, notch or pattern an electrode or a portion thereof, in which a coating portion coated with an electrode active material on a surface of a collector provided as metal foil and a non-coating portion that is distinguished from the coating portion and is not coated with the electrode active material are formed at a certain interval, to form a tab. That is, according to the present invention, the electrode is provided to the notching unit 300 in a state in which the electrode active material is continuously applied to one surface or both surfaces of the collector that has a constant width and is continuously provided and then is continuously discharged after being sheared or notched.

The notching unit 300 according to the present invention is configured so that the electrode 1 wound in a roll shape is transferred through a plurality of rollers. A processing device is disposed on the transfer path so that the processing device continuously shears the electrode into a predetermined pattern. A vision device and/or a sensor for monitoring whether the shearing or notching is normally performed may be additionally disposed in the notching unit 300.

The electrode 1 processed in and discharged from the notching unit 300 is transferred to the drying unit 100. The electrode 1 continuously passes through the drying unit 100 so as to be dried. That is, the drying unit 100 is disposed between the notching unit 300 and the collecting unit 200 so that the electrode 1 is dried while continuously moving.

Figure 2:
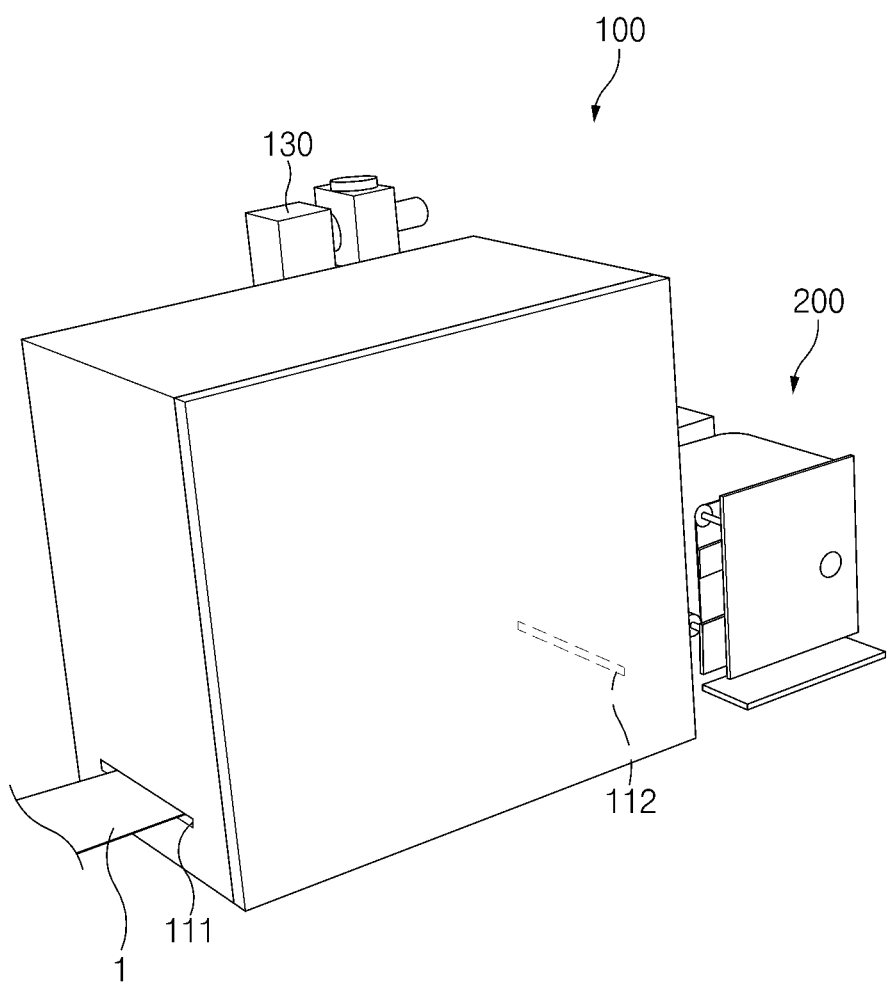
FIG. 2 is a perspective view of a drying unit provided in the electrode notching apparatus for the secondary battery according to an embodiment of the present invention.

As illustrated in FIG. 2, the drying unit comprises a heating body 110 having an inlet through which the electrode is introduced and an outlet through the electrode 1 is discharged, the heating body 110 provided with a drying space 116 (see FIG. 3) that is a passage, through which the electrode 1 passes therein, and lamp parts 120 mounted on the heating body 110 to irradiate infrared rays onto a surface of the electrode 1 while the electrode 1 moves through the drying space 116. Moisture contained in the surface of the electrode 1 is dried by the infrared rays irradiated from the lamp parts 120, and the electrode 1 discharged from the drying unit 110 is wound and collected by the collecting unit 200.

Figure 3:
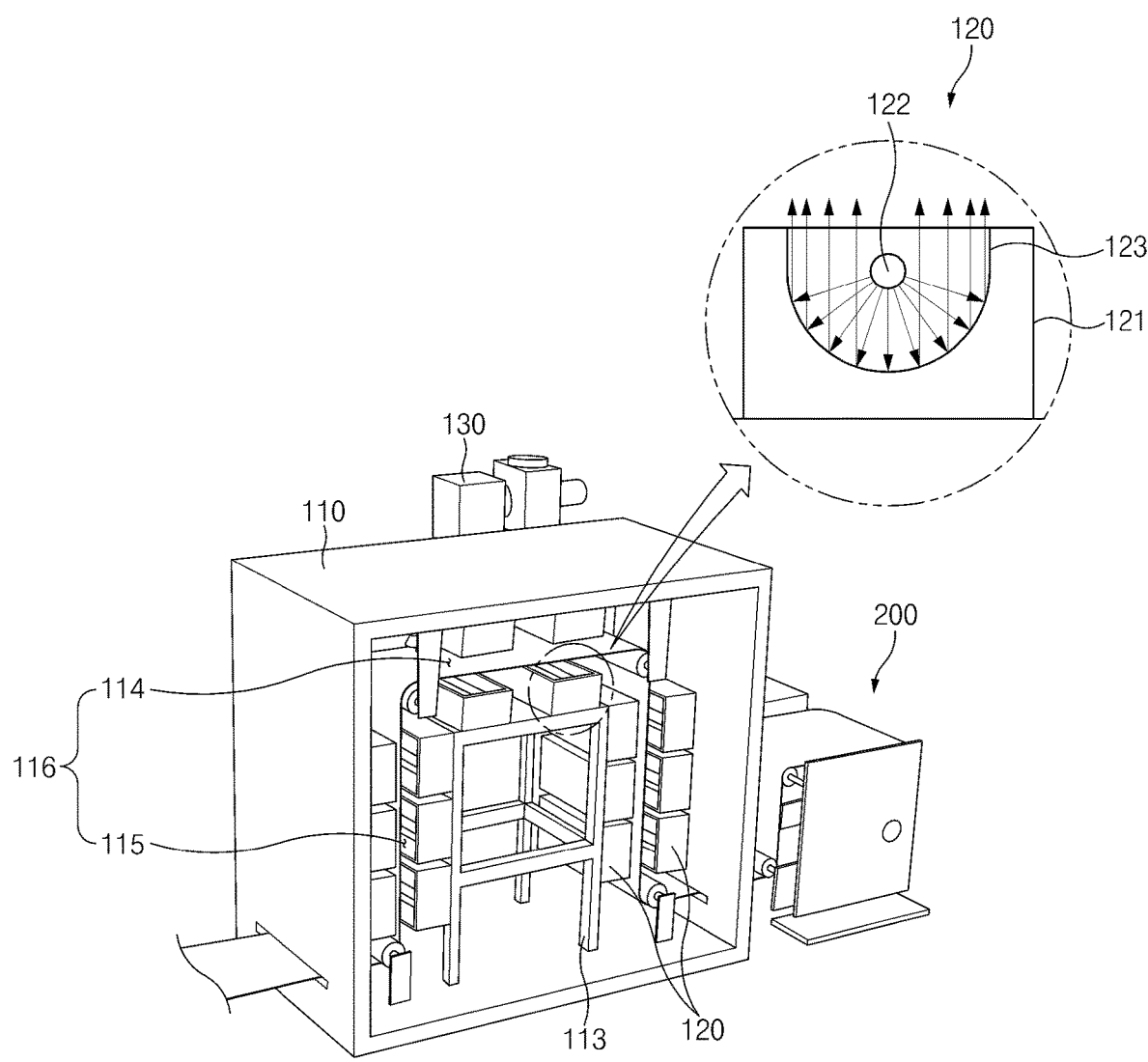
FIG. 3 is a perspective view illustrating a state in which a portion of the drying unit of FIG. 2 is opened.
Figure 4:
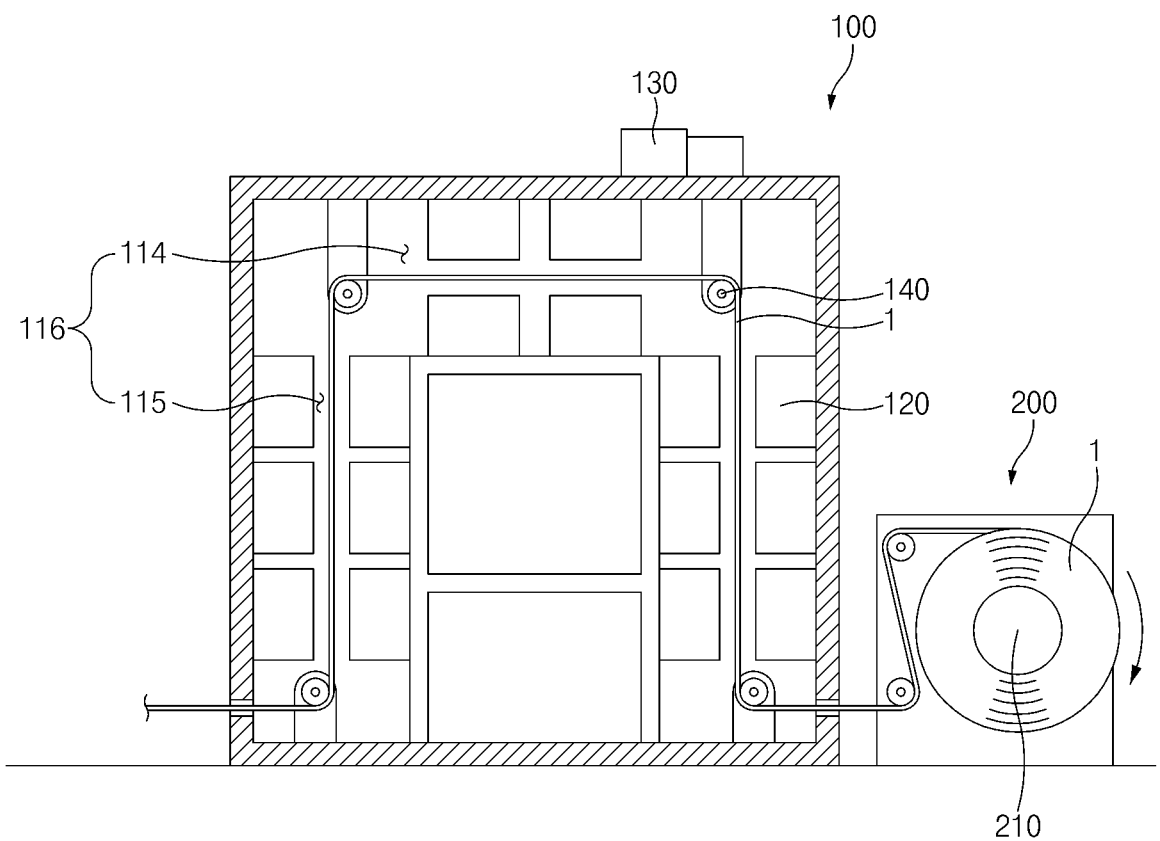
FIG. 4 is a cross-sectional view of the drying unit of FIG. 2.

As illustrated in FIGS. 3 and 4, an auxiliary frame 113 having a vertical surface of which both side surfaces are vertically erected and a horizontal top surface is built in the heating body 110. Also, the lamp parts 120 are mounted on the vertical surface and the horizontal surface of the auxiliary frame 113, and the lamp parts 120 are respectively installed on a wall surface within the heating body 110, which face the lamps mounted on the auxiliary frame 113.

Thus, the lamp parts 120 are continuously disposed so that the lamp parts 120 mounted on the auxiliary frame 113 and the lamp parts 120 installed on the wall surface within the heating body 110 are paired with each other. Also, the drying space 116 serving as the drying space through which the electrode 1 passes is formed between the pair of lamps 120 facing each other. The drying space 116 has one side connected to the inlet 111 of the heating body 110 and the other side connected to the outlet 112 of the heating body 110. Thus, the electrode 1 is introduced into the notching unit 300 to pass through the drying unit 100 and then is discharged to the collecting unit 200.

The drying space 116 may be divided into a horizontal section 114 formed in a horizontal direction and a vertical section 115 formed in a vertical direction relative to a ground or a floor so that the path onto which the infrared rays are irradiated increases to improve a drying rate of the electrode. Also, at least one transfer roller 140 for switching a direction is disposed at a point at which the electrode 1 is switched between the horizontal section 114 and the vertical section 115.

Thus, as illustrated in the drawing, the vertical section 115 of the drying space 116 is formed at a position at which the electrode 1 passes through the vertical surface of the auxiliary frame 113, and the vertical section 114 is formed at a position at which the electrode 1 passes through the horizontal surface of the auxiliary frame 113. For reference, although two vertical sections 115 are connected to one horizontal section 114 in the drawing, the horizontal section 114 and the vertical sections 115 may be disposed in various shapes according to sizes and an arranged structure of the lamp parts 120.

Figure 5:
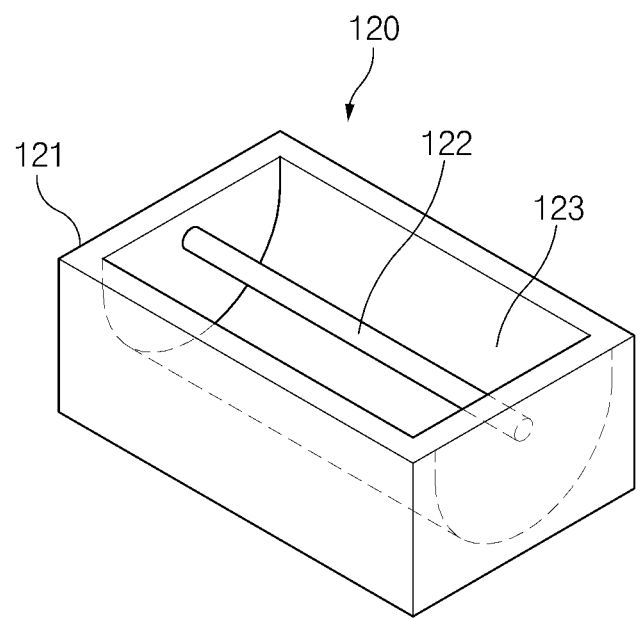
FIG. 5 is a perspective view of a lamp part provided in the drying unit.

As illustrated in the cross-sectional view of FIG. 3 and the perspective view of FIG. 5, the lamp part 120 according to the present invention has a structure in which a heating lamp 122 and a reflection plate 123 are mounted on a housing 121.

The housing 121 has a structure of which one side is opened so that light of the heating lamp 122 is irradiated toward the electrode 1, and an opposite side is mounted on one of the horizontal surface and the vertical surface of the auxiliary frame 113 and the inner wall surface of the heating body 110. Cables for supplying power to the heating lamp 122 may be additionally installed in the housing 121, and safety devices for preventing overheating may be selectively installed in the housing 121.

The heating lamp 122 mounted in the housing 121 is a lamp for irradiating infrared rays according to the applying of power or when power is supplied thereto. Although the heating lamp 122 has a straight shape (e.g., a circular rod shape having a predetermined diameter such as a rod-type fluorescent light) and is mounted in parallel to a longitudinal direction of the housing 121 in an embodiment of the present invention, the heating lamp 122 having a bulb shape may be mounted according to a process design. The infrared rays irradiated from the heating lamp 122 according to the present invention are infrared rays having a wavelength within a specific range (more specifically, for example, in a range of 0.75 μm to 7 μm). Thus, moisture remaining on the surface of the electrode 1 absorbs the infrared rays irradiated from the heating lamp 122, and the absorbed infrared rays stimulate electrons of the moisture to evaporate the moisture from a liquid state into a gas state. That is, the heating lamps according to the present invention irradiate infrared rays having a wavelength in a specific range in which the infrared rays are reflected more smoothly than absorption in the collector and smoothly absorbed into the active material to generate heat in only the active material of the electrode. That is, the drying may be performed in a manner, in which a molecular motion is activated in only the active material, to prevent the collector from being thermally deformed, and also, a temperature rise inside the drying chamber may be suppressed to improve durability of the peripheral devices. Here, an optimal wavelength range required for the drying may vary depending on materials, surface gloss, and the like of the collector and the active material. However, the optimal wavelength range may be determined through repeated experiments during the drying process. However, when the wavelength of the infrared rays is 7 um or more, an absorption rate may be reduced to deteriorate drying efficiency. When the wavelength of the infrared rays is 0.75 um or less, a reflectance of the collector may be reduced, and thus, the collector may also be heated. Thus, in this embodiment, it is preferable, but not required that the infrared rays have the wavelength within a range of 0.75 um to 7 um. In embodiments, the wavelength within a range of 0.75 um to 7 um provides an absorption rate of the infrared rays into the active material that is higher than that of the infrared rays into the collector.

Furthermore, the reflection plate 123 which reflects the infrared rays irradiated from the heating lamp 122 toward the opened side of the housing 121 is mounted at an opposite side of the opened side with respect to the point at which the heating lamp 122 is installed in the housing 121. The reflection plate 123 is made of a material having a high infrared reflectance and formed in a concave shape having a predetermined curvature so that the infrared rays are concentrated onto the surface of the electrode in consideration of refraction characteristics.

Since the heating lamp 122 having the straight shape (the rod shape) is used, and the infrared rays are concentrated by the reflection plate 123, the lamp part 120 according to the present invention may more quickly heat the surface of the electrode when compared to the structure in which the heating lamp having the bulb shape is used.

Figure 7A:
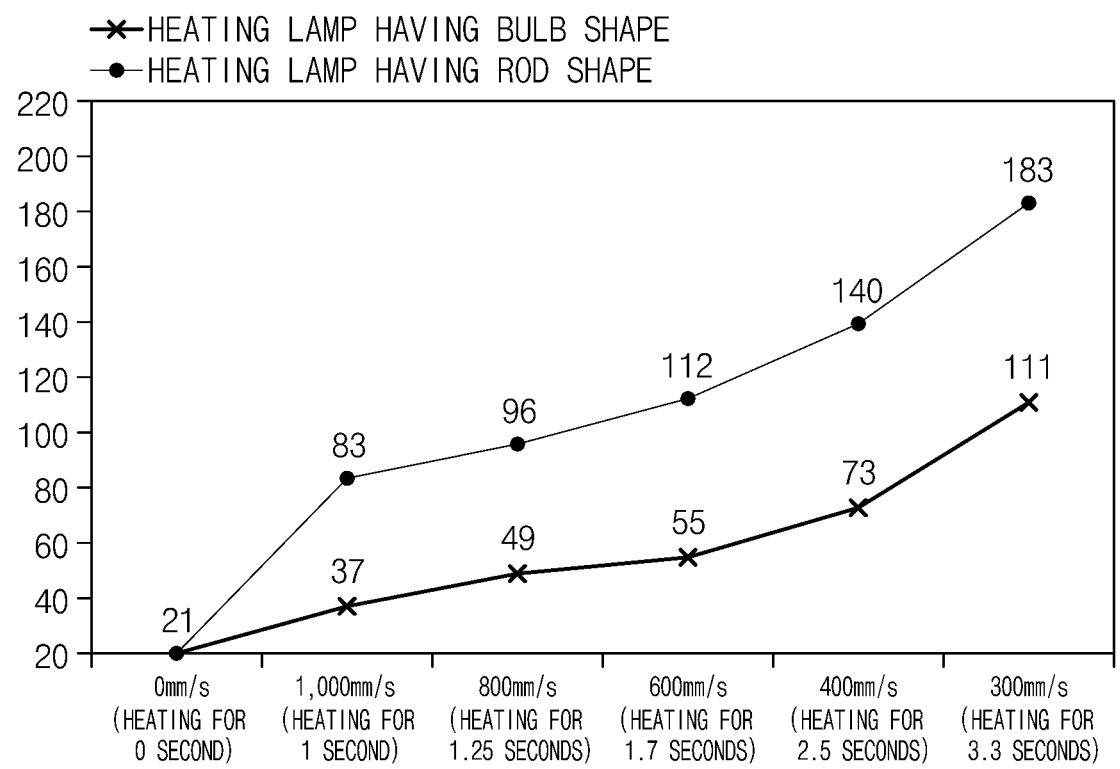
FIG. 7A is a comparison graph illustrating a variation in temperature according to a heating time when a heating lamp having a bulb shape is used and when a heating lamp having a rod shape (a straight shape) is used.
Figure 7B:
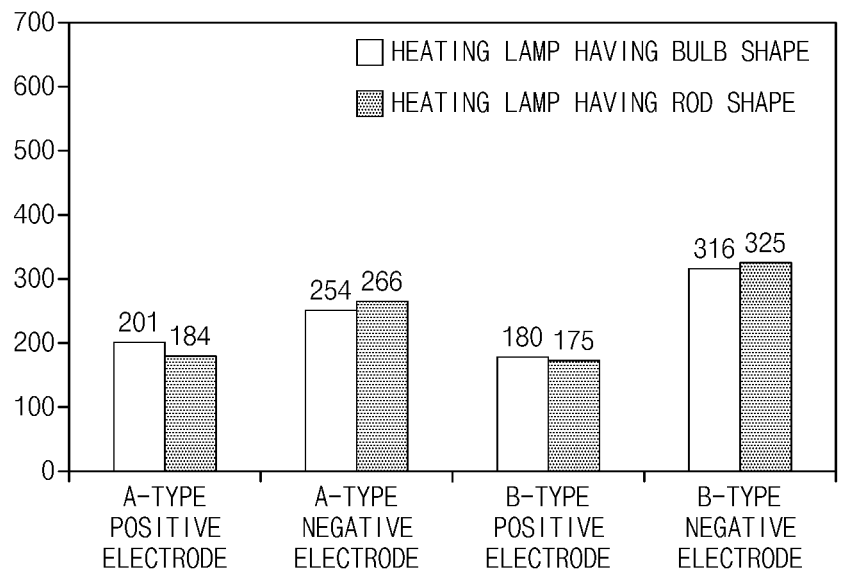
FIG. 7B is a comparison graph illustrating a content of moisture per unit area of a surface of a dried electrode when the heating lamp having the bulb shape is used and when the heating lamp having the rod shape (the straight shape) is used.

FIG. 7A is a comparison graph illustrating a variation in temperature according to a heating time when the heating lamp having the bulb shape is used and when the heating lamp having the rod shape (a straight shape) is used. Here, a horizontal axis represents a moving speed (a heating time), and a vertical axis represents a surface temperature (° C.) of the electrode. FIG. 7B is a comparison graph illustrating moisture (ppm) per unit area of a surface of a dried electrode when the heating lamp having the bulb shape is used and when the heating lamp having the rod shape (the straight shape) is used. As illustrated in FIG. 7A, since the infrared rays are concentrated onto the surface of the electrode 1 without being scattered, the heating lamp 122 according to the present invention may more quickly heat the surface of the electrode. That is, it is confirmed that the heating lamp 122 having the rod shape according to the present invention has heating efficiency that is improved by about two times compared to the heating lamp having the bulb shape. Also, as illustrated in FIG. 7B, even when the electrodes having different specifications are dried, the heating lamp 122 according to the present invention may provide a drying rate that is similar to that (similar to a final moisture content) when using the heating lamp having the bulb shape. That is, since the heating lamp 122 having the straight shape more quickly heats the electrode than the heating lamp having the bulb shape, a transfer speed of the electrode 1 may further increase to improve the drying rate while achieving the same level of drying performance.

For reference, although the heating body 110 illustrated in the drawing has a rectangular box shape, the heating body 110 may have a dome shape according to design requirements, and also, a transparent window may be attached to the heating body 110 so that a worker visually confirms the processes from the outside. Furthermore, an openable door or cover may be installed to facilitate replacement, equipment inspection, repair, and the like of the lamp parts 120.

An interval between the lamp parts 120 and an arranged structure of the lamp parts 120 may be tuned according to moisture absorption of the electrode 1, and the heating lamps 122 may be replaced with the heating lamps 122 that irradiate the optimum infrared rays according to the necessity of the process. For example, the interval between the lamp parts 120 may be regularly formed or irregularly formed so that a specific section is more concentratedly dried.

Although the heating lamps 120 are mounted one by one to the housings 121 in the drawing, two or more heating lamps 120 may be mounted if necessary. In this case, the reflection plate 123 may also be changed in shape. The housing 123 may be permanently coupled through welding or the like but may be detachably mounted through bolt coupling or an exclusive bracket. Here, the exclusive bracket may be able of slide the housing in up/down and left/right directions as well as adjust an angle thereof (within an allowed range), and it may be acceptable to mount several kinds of conventional housings 121 having different sizes and shapes.

Furthermore, an exhaust device 130 for discharging the moisture evaporated in the heating body 110 to the outside is mounted in the heating body 110. The exhaust device 130 may comprise a device that absorbs the gaseous moisture evaporated in the heating body 110, and an air conditioner for properly maintaining a temperature and humidity within the heating body 110 may be used together. The air conditioner may discharge heat to the outside when the temperature within the heating body 110 abnormally increases to prevent electric device comprising the lamp part 120 from being damaged. Here, the air conditioner may be configured to be interlocked with a cooling device that may be mounted together with the individual lamp parts 120.

Also, although the transfer direction is switched by the transfer rollers 140 when the electrode 1 passes through the vertical section 115 and the horizontal section 114 in the drawing, an alternative device providing the same function may be used in place of the transfer rollers 140, and the transfer rollers 140 may be connected to additional rotating devices to maintain proper tension and speed while the electrode 1 passes.

The electrode 1 passing through the above-described drying unit 200 is wound in the collecting unit 200. As illustrated in FIG. 4, the collecting unit 200 further comprises a collecting roller 210 winding the electrode 1 so as to be wound therearound and a plurality of small rollers that determine a winding position of the electrode 1 before winding the electrode 1 around the collecting roller 210 to maintain proper tension.

Hereinafter, a notching method using the electrode notching apparatus for the secondary battery according to Embodiment 1 of the present invention will be described according to Embodiment 2.

Embodiment 2

Figure 6:
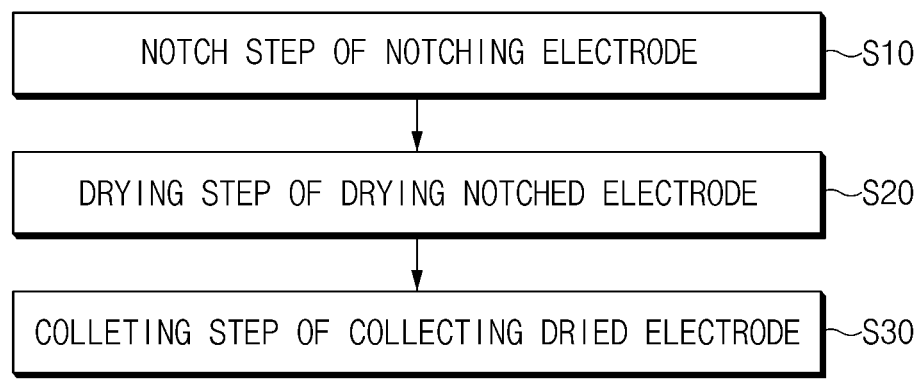
FIG. 6 is a flowchart illustrating an electrode notching method for a secondary battery according to an embodiment of the present invention.

As illustrated in FIG. 6, an electrode notching method for a secondary battery according to an embodiment of the present invention comprises: a notching step or operation (S10) of shearing an electrode 1 into a predetermined electrode pattern through a notching unit 300; a drying step or operation (S20) of directly heating a surface of the electrode 1 processed in the notching step by using the drying unit 200 to dry moisture remaining on the electrode 1; and a collecting step or operation (S30) of collecting the electrode 1 dried in the drying step into the collecting unit 200.

In the notching step (S10), when a non-processed electrode 1 wound in a roll shape is supplied through a plurality of rollers, a processing device shears the electrode into a predetermined electrode pattern, and whether the shearing is faulty is detected through a vision device and/or a sensor.

In the drying step (S20), while the electrode 1 on which the notching step (S10) is performed passes through a heating body 110 of the drying unit 100, infrared rays are irradiated onto the electrode 1 by a lamp part 120, and the absorbed infrared rays stimulate molecules of the moisture to evaporate the moisture, thereby drying the electrode 1. Here, the electrode 1 passes through a vertical section formed in a vertical direction perpendicular to the ground or the floor and a horizontal section 114 formed in a horizontal direction parallel to the ground so that a path on which the infrared rays are irradiated is lengthened.

In the collecting step (S30), the electrode discharged through an outlet of the heating body is wound and collected into the collecting unit 200.

In the electrode notching apparatus for the secondary battery according to the present invention, the drying unit may be configured so that the notched electrode 1 is continuously dried to quickly dry the moisture remaining on the electrode 1, thereby reducing the entire process time and improving the productivity. That is, the productivity may be improved when compared to the conventional process in which the notched electrode 1 moves and is stored so as to be dried in the unit of the certain quantity.

The drying unit 100 may comprise the plurality of heating lamps 122. Thus, the heating lamps 122 may dry the surface of the electrode 1 by irradiating the infrared rays, and thus, the drying rate may be excellent, the surface of the electrode may be dried more uniformly than the conventional hot air drying, and the drying time may be reduced.

In addition, since the lamp part 100 is manufactured in the manner in which the heating lamp 122 is mounted in the housing 121 with the reflection plate 123 mounted, the infrared rays may be concentrated into one point on the surface of the electrode 1 without being scattered, and the heating lamp 122 may be easily replaced when the lamp is damaged, or the lifetime of the lamp is over, or if the heating lamp having a higher output is required.

Also, according to the present invention, the drying space 116 in which the electrode 1 is dried may have the horizontal section 114 formed in the horizontal direction and the vertical section 115 formed in the vertical direction perpendicular to the horizontal section 114 within the drying unit 100, and the transfer roller 140 for switching the transfer direction of the electrode 1 may be disposed at the point at which the horizontal section 114 and the vertical section 115 are switched. Thus, the drying space may increase in length within the heating body 110 to improve the drying performance.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A notching apparatus for a secondary battery, the notching apparatus comprising:
   a notching unit including a roller, the notching unit configured to notch a portion of an electrode that is continuously supplied;
   a drying unit drying the electrode while the electrode discharged from the notching unit passes therethrough; and
   a collecting unit of collecting the electrode discharged from the drying unit,
   wherein the drying unit comprises a heating body provided with a drying space that is a passage through which the electrode passes therein, and lamp parts mounted on the heating body to irradiate infrared rays onto a surface of the electrode while the electrode moves through the drying space.

2. The notching apparatus of claim 1, wherein each of the lamp parts comprises:
   a housing of which a side facing the electrode is opened and which is fixed and mounted on the drying unit;
   a heating lamp mounted on the housing to generate the infrared rays; and
   a reflection plate mounted on the housing to reflect the infrared ray irradiated from the heating lamp to the opened side of the housing.

3. The notching apparatus of claim 2, wherein the heating lamp has a straight shape and is mounted in parallel to a longitudinal direction of the housing.

4. The notching apparatus of claim 2, wherein the heating lamp has a bulb shape.

5. The notching apparatus of claim 2, wherein the reflection plate has a concave shape to reflect the infrared rays generated by the heating lamp to the opened side.

6. The notching apparatus of claim 2, wherein the electrode has a structure in which an active material is applied to a surface of a collector made of a metal material, and
   wherein the infrared rays irradiated from the heating lamp has a wavelength within a range of 0.75 um to 7 um so that an absorption rate of the infrared rays into the active material is higher than that of the infrared rays into the collector.

7. The notching apparatus of claim 1, wherein the lamp parts facing each other are contiguously disposed or disposed with an interval therebetween, and
   spaces between the lamps facing each other are connected to each other to constitute the drying space.

8. The notching apparatus of claim 7, wherein the drying space has a horizontal section formed in a horizontal direction and a vertical section formed in a vertical direction within the drying unit.

9. The notching apparatus of claim 8, further comprising a transfer roller switching a transfer direction and disposed at a portion at which the electrode is switched between the horizontal section and the vertical section.

10. The notching apparatus of claim 9, wherein an auxiliary frame having a vertical surface of which both side surfaces are vertically erected and a horizontal top surface is built in the heating body, and a portion of the lamp parts is mounted on the vertical surface and the horizontal surface of the auxiliary frame, and wherein the vertical section of the drying space is formed at a position at which the electrode passes through the vertical surface of the auxiliary frame, and the horizontal section is formed at a position at which the electrode passes through the horizontal surface of the auxiliary frame.

11. The notching apparatus of claim 1, wherein the collecting unit comprises a collecting roller winding the electrode so that the electrode is wound therearound.

12. The notching apparatus of claim 1, wherein an exhaust device for discharging moisture evaporated in the heating body to an outside of the heating body is mounted in the heating body.

13. An electrode notching method for a secondary battery, the electrode notching method comprising:

a notching operation of notching a portion of an electrode, which is continuously supplied, into a predetermined electrode pattern;

a drying operation of irradiating infrared rays onto a surface of the notched electrode to dry the electrode; and a collecting operation of collecting the dried electrode, wherein, in the drying operation, the electrode is dried while passing through a drying space into which the infrared rays are irradiated, and wherein the drying space has a portion formed in a horizontal direction parallel to a ground and a portion formed in a vertical direction perpendicular to the ground.

14. The electrode notching method of claim 13, wherein a transfer roller is disposed between the portion formed in the horizontal direction and the portion formed in the vertical direction in the drying space, and wherein a transfer direction of the electrode is changed through the transfer roller, a drying space, and wherein a transfer direction of the electrode is changed through the transfer roller.

15. A notching apparatus for a secondary battery, the notching apparatus comprising:

a notching unit with a processor device to notch or shear a portion of an electrode that is continuously supplied;

a dryer to dry the electrode while the electrode discharged from the notching processor passes therethrough; and a collector to collect the electrode discharged from the dryer, wherein the dryer comprises a heating body provided with a drying space that is a passage through which the electrode passes therein, and lamp parts mounted on the heating body to irradiate infrared rays onto a surface of the electrode while the electrode moves through the drying space.

* * * * *